United States Patent

Kresock

[15] 3,694,567

[45] Sept. 26, 1972

[54] CONSTANT AMPLITUDE PHASE SHIFTER

[72] Inventor: John M. Kresock, Fort Wayne, Ind.

[73] Assignee: The Magnovox Company, Ft. Wayne, Ind.

[22] Filed: May 11, 1970

[21] Appl. No.: 36,018

[52] U.S. Cl.........178/5.4 CK, 178/5.4 SY, 323/122, 323/125, 178/5.4 HE

[51] Int. Cl.............................H04n 9/44, H04n 9/48

[58] Field of Search.........178/5.4 HE, 5.4 R, 5.4 CK, 178/5.4 SY, 69.5 CB; 307/262; 328/155, 165; 323/121–126

[56] References Cited

UNITED STATES PATENTS

| | | | |
|---|---|---|---|
| 2,961,484 | 11/1960 | Macovski | 178/5.4 CK |
| 3,406,249 | 10/1968 | Spies | 178/5.4 CK |
| 3,527,964 | 9/1970 | Hansen et al. | 307/262 |
| 2,955,154 | 10/1960 | Macovski | 178/69.5 CB |
| 3,012,094 | 12/1961 | Smith, Jr. et al. | 178/69.5 CB |

*Primary Examiner*—Robert L. Richardson
*Attorney*—Richard T. Seeger

[57] ABSTRACT

In many color television circuitry designs, a 3.58 mHz reference signal is provided to the automatic phase control phase detector and the color killer phase detector, and in a closed loop color synchronization circuit, the reference signal to the color killer detector is shifted in phase 90° relative to the automatic phase control detector. In addition, harmonics of the reference signal and color burst signal must be controlled. Further, in many circuits an adjustable phase section is added to adjust the phase of the reference signal to the automatic phase control detector and the color killer detector for tint control. This invention provides circuitry which will bypass the harmonics to ground and compensate for the impedances of such harmonic bypass circuit and the color killer detector fixed phase shifter and provides a substantially constant amplitude to the phase detectors for all positions of the adjustable phase shift circuit. In a preferred embodiment, an equivalent resistance is uniquely determined and the impedance of a harmon bypass circuit and the fixed phase shift device of the color killer detector is made substantially equal to this equivalent resistance to provide the constant amplitude signal to the detectors.

3 Claims, 3 Drawing Figures

PATENTED SEP 26 1972

3,694,567

ADMITTANCE DIAGRAM

JOHN M. KRESOCK
INVENTOR

ATTORNEY

CONSTANT AMPLITUDE PHASE SHIFTER

A BRIEF SUMMARY OF INVENTION

In color television circuits having a closed loop color synchronization circuit with a synchronous color killer, it is required that the 3.58 mHz reference signal to the color killer detector lead or lag signal to the automatic phase control detector by 90°. In addition, it is desirable that the harmonics which are generated by the CW oscillator supplying the reference signal to the automatic phase control detector and the color killer detector, and the color burst harmonics from these latter detectors be controlled since harmonics cause beats, especially during low signal strength. In certain circuits, included within the scope of this invention, it is also desirable to have an adjustable phase shift to adjust the phase of the reference signal going to the automatic phase control detector and the color killer detector. As is known in the art, it is highly desired to have the amplitude of the reference signal going to these detectors substantially constant over all ranges of operations and in order to accomplish this, and at the same time provide a constant phase shift to the color killer detector circuit and control the harmonics, and provide an adjustable phase shift to the detectors, presents a problem not heretofore solved.

This invention overcomes and provides a solution for these problems by teaching the manner and means of circuit design which satisfactorily provides the impedances of the harmonic bypass and fixed phase shift circuits under the wide variations of phase adjustments to provide a substantially constant amplitude reference signal to the color killer and automatic phase control detector circuits while providing a circuit for bypassing the harmonics to ground. The manner in which this solution is carried out in a preferred embodiment later described is to provide a capacitor so placed as to pass harmonics to ground and provide an equivalent resistance which is determined in a novel manner and then to make the impedance of the constant phase shift circuit for the color killer detector and the capacitors which bypass the harmonics to ground substantially equal to this equivalent resistance. This equivalent resistance is determined by plotting the admittance of a variable phase shift circuit over a range of phase variations and plotting the locus of these admittances as the adjustable phase shift control is varied. In this preferred embodiment, once this locus has been determined, the radius of the arc is graphically found and is compared with the admittance of circuit G when this admittance is entirely real or that value where $j$ equals zero, and the equivalent resistive admittance of $R_E$ is equal to the difference between the radius and the admittance of the variable phase shift circuit at the $j$ equals zero point. These and other objects and advantages will become more apparent when the above referred to preferred embodiment is considered in connection with the following drawings.

DRAWINGS

DETAILED DESCRIPTION

Figure 1:
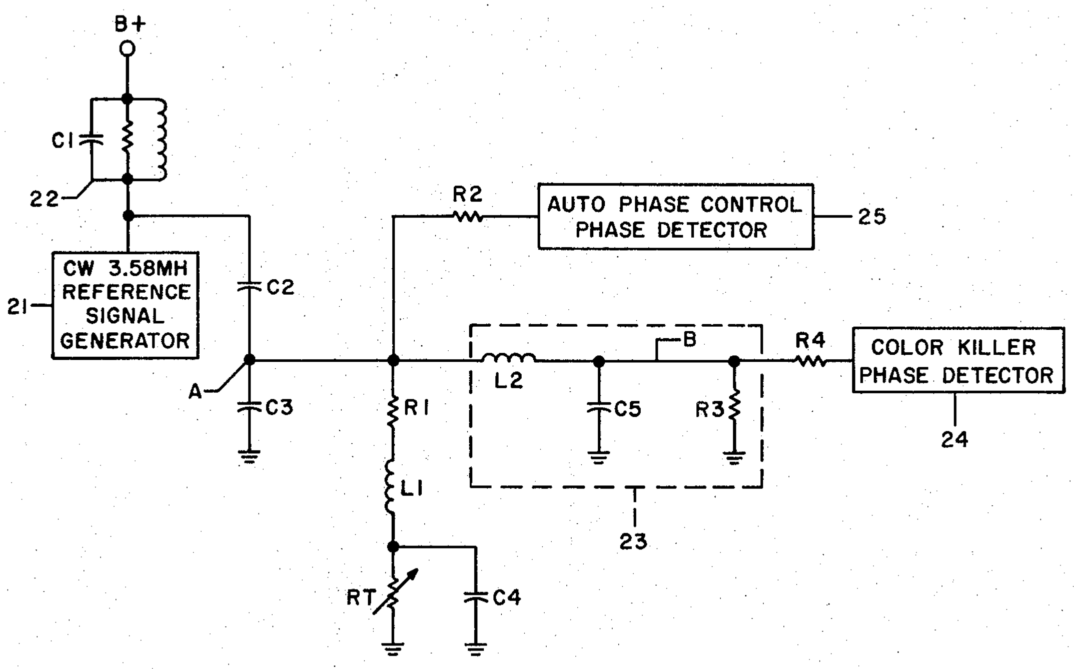
FIG. 1 is a schematic showing the circuitry between the reference signal and the automatic phase control phase detector and the color killer phase detector with the constant phase shift circuit, the harmonic bypass capacitors, and the adjustable phase shift circuit placed therebetween.

In FIG. 1 is shown a reference signal generator 21 which could be typically a pentode section of a 6GH8 CW oscillator tube, the plate of which is connected to resonant circuit 22, which resonates at 3.58 mH and which sends a sinusoidal signal through capacitor $C_2$ which provides a high impedance compared to the impedance of the circuit following $C_2$ including phase detectors 24, 25 so that the current at Point A is substantially capacitive and at a substantially constant amplitude.

This invention provides a capacitor $C_3$ between Point A and ground to pass substantially all of the harmonics coming from the color reference signal means 21. Connected to Point A is a color killer phase shift circuit 23 comprising an inductance $L_2$ connected to Line B and a capacitance $C_5$ connecting Line B to ground and a resistance $R_3$ connecting Line B to ground. From Line B, the signal goes through $R_4$ to the color killer phase detector 24 of a closed loop synchronization circuit which is well known in the art.

$L_2$ provides a high-impedance to harmonics from the color killer phase detector 24 and $C_5$ is low impedance to ground for these same harmonics so that any harmonics coming from the detector 24 tend to be shunted to ground through $C_5$. Circuit 23 provides a 90° lag of the signal to the detector 24 and yet maintains a one to one signal amplitude across $L_2$.

Also connected to Point A voltage is Resistor $R_2$ which passes the fundamental signal to automatic phase control phase detector circuit 25 which also is a part of the closed loop color synchronization system above referred to and well known in the art. The automatic phase control phase detector circuit 25 also emits color burst harmonics which are passed to ground through $C_3$. Therefore, $C_3$ acts to pass harmonics of the reference fundamental emitted by the reference signal 21, and harmonics of the color burst fundamental emitted by automatic phase control phase detector 25 and the color killer phase detector 24.

Also connected to the signal at Point A is the circuit containing resistance $R_1$, inductance $L_1$, variable resistance $R_T$, and capacitance $C_4$. This circuit provides a means of varying the phase of the fundamental signal to detectors 24, 25 by varying the resistance of $R_T$. This variation of phase is desirable to vary the hue of the signal on the television receiver, but its use, and the use of capacitor $C_3$ together with elements $L_2$, $C_5$, and $R_3$, present unusual problems in maintaining a constant amplitude signal to detectors 24, 25. The following means have been devised to overcome these problems.

Figure 2:
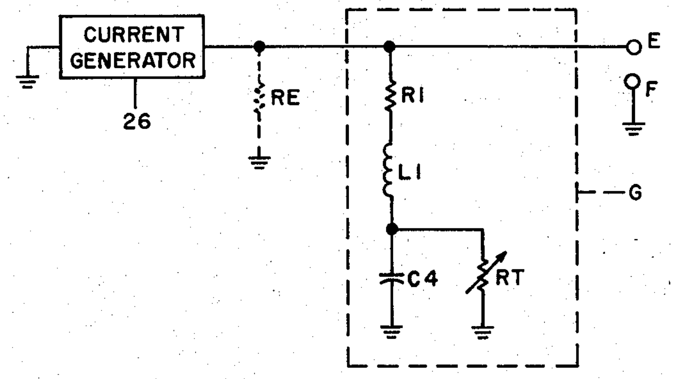
FIG. 2 is a schematic showing the circuitry for dedetermining the value of $R_E$ or the equivalent resistance.
Figure 3:
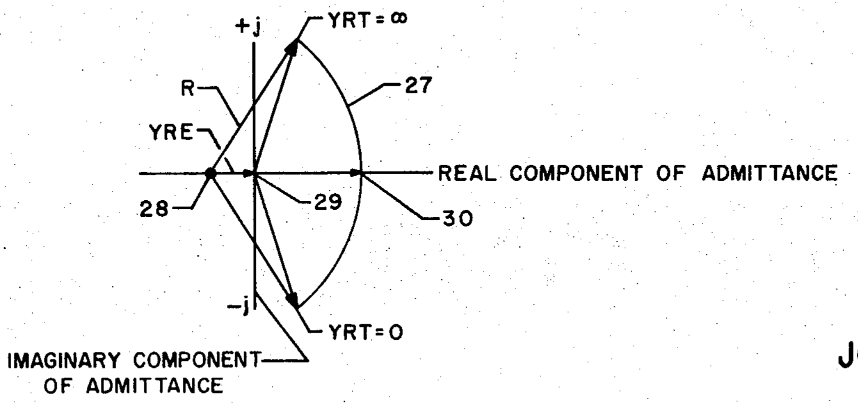
FIG. 3 is an admittance vector diagram plotted according to the data taken from the circuit of FIG. 2 and indicating the vector construction for determining $R_E$.

In FIG. 2 is shown circuitry and FIG. 3 is shown a diagram showing the development of circuit parameters to solve the above problems. In FIG. 2 is shown a current generator 26 which is the equivalent of generator 21, circuit 22, and capacitor $C_2$ of FIG. 1. Generator 26 is connected to the circuit having resistance $R_1$, inductance $L_1$, capacitance $C_4$ and resistance $R_T$. Elements $R_1$, $L_1$, $C_4$, and $R_T$ correspond to the elements correspondingly marked in FIG. 1. $R_E$ is shown in dashed lines and is the value being determined and is substantially the equivalent resistance of the load provided to the circuit by $L_2$, $C_5$, $R_3$, and $C_3$. $R_E$ is shown only to indicate where it would be in relation to circuit G once $R_E$ has been determined. By varying $R_T$ and plotting the phase angle (which is determined by value of $R_T$) of the circuit G v. the magnitude of the admittance of the circuit G shown in FIG. 2 taken at terminals E and F, obtains arc 27 which is a locus of the admittances of $Y_{EF}$ as the admittance of $R_T$ is varied from zero to infinity. The approximate center 28 for the arc 27 is determined geometrically and the radius R of arc 27 is then compared with the admittance of circuit G at the zero line and the difference $Y_{RE}$ between point 28 and point 29 is the admittance of $R_E$.

From this $R_E$ is determined and through methods known to the art, such as set forth in the text entitled "Electrical Engineering Circuits," 2d Edition, by Hugh Hildreth Skilling, published by Wiley, the equivalent load resistance of elements $C_3$, $L_2$, $C_5$, and $R_3$ can be made equal to $R_E$.

$R_1$ is selected to place limits on the phase range that can be obtained by adjusting $R_T$. In the present instance, range is approximately ±45° from the central setting and is that angle measured at 28.

The load of phase detectors 24, 25 may be neglected in the computation of the equivalent resistance of elements $C_3$, $L_2$, $C_5$, and $R_3$, since the load is of small consequence in determining the amplitude of the signals at line B and point A.

$R_1$ and $L_1$ are designed to restrict harmonic flow and $C_4$ is the cable capacitance of the $R_T$ cable, but if any harmonics do get through $R_1$ and $L_1$, they are bypassed to ground through $C_4$.

In the preferred embodiment disclosed, the components may have the following values:

| | |
|---|---|
| $C_2$ | 12 pf |
| $C_3$ | 100 pf |
| $C_4$ | 100 pf |
| $C_5$ | 39 pf |
| $R_1$ | 82 ohms |
| $R_2$ | 100 ohms |
| $R_3$ | 1.1 K-ohms |
| $R_4$ | 100 ohms |
| $R_T$ | 1.2 K-ohms |
| $L_1$ | 5.6 uh |
| $L_2$ | 47 uh |

It will be understood that modifications and variations may be effected without departing from the spirit and scope of the novel concepts of this invention.

I claim:

1. Apparatus comprising
input means,
output means,
constant phase shift means,
said constant phase shift means being between said input means and output means to provide a fixed adjustment of the phase of a signal therebetween,
shunt means for shunting away predetermined unwanted signals from both said input means and output means,
variable phase shift means for providing a variable adjustment of the phase between said input and output means,
the sum of the admittances of said constant phase shift means, said shunt means and said variable phase shift means being substantially equal at a plurality of phase shift positions.

2. Constant amplitude phase shift circuit comprising
input means for providing a fundamental signal,
output means comprising a first and second output for receiving the fundamental signal,
constant phase shift means including inductance, capacitance, and resistance means for providing a constant phase shift of the fundamental to said second output,
bypass means for bypassing to ground harmonics from both said input means and output means,
variable phase shift means for providing a variable adjustment of the phase between said input and output means,
the sum of the admittances of said constant phase shift means, said harmonic bypass means and said variable phase shift means being substantially equal at a plurality of phase shift positions.

3. Constant amplitude phase shift circuit comprising
automatic phase control phase detector,
color killer phase detector,
CW oscillator for providing a reference signal to said automatic phase control phase detector and the color killer phase detector,
phase shift means comprising means for shifting the phase of the reference signal to the color killer phase detector substantially 90° from the phase provided to the automatic phase control phase detector,
capacitor means for bypassing to ground harmonics from both of said phase detectors and from said CW oscillator,
variable phase shift means for variably shifting the phase of the reference signal to both of said phase detectors,
the admittance of the equivalent resistance of said phase shift means plus said capacitor means being substantially equal to that admittance required to be added to the admittance of the variable phase shift circuit to provide a substantially constant amplitude admittance for the combination of said phase shift means, variable phase shift means and capacitor means over the phase shift range of said variable phase shifter to provide a substantially constant amplitude signal to said automatic phase control and color killer phase detectors over the range of phase shift of said phase shift means.

* * * * *